United States Patent [19]

France et al.

[11] 4,410,567
[45] Oct. 18, 1983

[54] OPTICAL FIBRES AND COATINGS THEREFOR

[75] Inventors: Paul W. France, Newbourne, Nr. Woodbridge; George R. Newns, Hintlesham, both of England

[73] Assignee: Post Office, London, England

[21] Appl. No.: 368,510

[22] Filed: Apr. 15, 1982

Related U.S. Application Data

[63] Continuation of Ser. No. 117,040, Jan. 31, 1980, abandoned.

[30] Foreign Application Priority Data

Feb. 1, 1979 [GB] United Kingdom ............. 7903532

[51] Int. Cl.³ ............................................. B05D 5/06
[52] U.S. Cl. ................................. 427/163; 65/3.3; 350/96.33
[58] Field of Search ........... 350/96.23, 96.30, 96.31, 350/96.33, 96.34; 65/3.11, 3.13, 3.3, 3.4, 3.41, 3.43, 3.44; 427/163, 164, 165, 169

[56] References Cited

U.S. PATENT DOCUMENTS

| | | | |
|---|---|---|---|
| 4,089,585 | 5/1978 | Slaughter et al. | 350/96.23 |
| 4,173,393 | 11/1979 | Maurer | 350/96.34 |
| 4,183,621 | 1/1980 | Kao et al. | 350/96.30 |
| 4,209,229 | 6/1980 | Rittler | 350/96.34 |
| 4,319,803 | 3/1982 | Burmeister et al. | 350/96.33 |

FOREIGN PATENT DOCUMENTS 7602236 12/1976 Netherlands ............. 350/96.33

OTHER PUBLICATIONS

Almeida et al, "On Line-Metal Coating of Optical Fibres," *Optik*, vol. 53, No. 3, Jun. 1979, pp. 231–233.

*Primary Examiner*—John D. Lee
*Attorney, Agent, or Firm*—Kemon & Estabrook

[57] ABSTRACT

In order to provide improved resistance to attack by atmospheric water etc. a clad glass optical fibre has a plastic coating which is in turn coated with a metal coating. The metal coating may in turn be coated with a second plastic coating. The metal coating is formed by drawing the plastic coated fibre through a globule of molten metal, the surface of which is exposed to an oxygen rich atmosphere.

14 Claims, 6 Drawing Figures

OPTICAL FIBRES AND COATINGS THEREFOR

This is a continuation of application Ser. No. 117,040, filed Jan. 31, 1980 (now abandoned).

The present invention relates to an improved optical fibre for telecommunications, and a method of manufacturing said fibre.

Clad optical fibres which have a core and a cladding made of glasses having differing refractive indices, and their use for the transmission of optical signals for telecommunication purposes have been known for a number of years. Optical fibres of this type have frequently been coated with plastics to preserve their strength. This is a well established technique, known for a considerable time, see "Optical Fibre Protection by Solution Plastic Coating"—P. W. France and P. L. Dunn—Proc. Second European Conference on Optical Fibre Communications—Paris 1976; "On Line Fibre Coating using Tapered Nozzles"—P. W. France et al—Proc 3rd European Conference on Optical Fibre Communications—Munich 1977; "Plastics Coated Glass Fibres for Optical Communication"—Proc Plastics in Telecommunications 2 Conference Plastics and Rubber Institute at IEE—London 1978.

One major cause of loss of strength in glasses (the term glass is intended to embrace vitreous silicas) is water attack in both liquid and vapour phase i.e. atmospheric moisture, which results in severe loss of strength. Plastics coating alone does not give long term protection against water attack.

For many years it has been known to provide telephone cables with a "water barrier" in the form of a metal foil, usually aluminium, which prevents water permeating the cable. Because of the small diameter of optical fibres, it is not practicable to provide foil water barriers of this type. With coating techniques used to apply metal coatings to optical fibres it is difficult to preserve the "pristine" surface of the glass and this may cause loss of strength. Previous attempts to provide a metal coating as a water barrier on the surface of fibres have failed, for this reason, and also because the metal coating has caused the optical attenuation of the fibre to increase unacceptably when the fibre undergoes strain cycling i.e. periodic application and removal of strain. This effect may be associated with micro bending of the fibre caused by the difference in thermal expansion between the fibre and the coating.

The term "pristine" surface refers to the glass surface formed immediately on cooling the glass after the formation of a fresh surface from the molten state, uncontaminated with water and other impurities. Glass articles, such as fibres, invariably have strengths considerably lower (sometimes several orders of magnitude lower) than the theoretical strengths they should possess. This loss of strength is caused by contamination and microscopic mechanical damage to the glass surface resulting in the creation of "Griffiths" flaws. Thus to enhance the strength of glass fibres it is necessary to preserve the "pristine" fibre surface over the operating lifetime of the fibre.

It has been found that although considerable improvement in strength is produced by plastics coating optical fibres, there is a long term deterioration in strength which, it is believed, is due to water penetration of the plastics. Metal coating the fibre surface fails to preserve the pristine surface, and increases optical attenuation. The present invention arose from the discovery that it is possible to form a metal coating, on a plastics coated glass fibre, which is substantialy free from water permeable defects, without damaging the glass surface, or causing unacceptable increases in optical attenuation. The present invention thus combines the advantages of a water impermeable metal coating, with a surface protecting plastics coating.

According to the present invention there is provided a glass optical fibre having a first plastics coating, surrounding and contiguous with the surface thereof, and a melt coating surrounding and contiguous with the surface of said first plastics coating.

Preferably a second plastics coating is provided, surrounding and contiguous with the surface of said metal coating.

Said metal coating may be formed of one of the low melting point metals, indium, lead, tin, zinc or aluminium, or an alloy of the above metals.

According to a second aspect of the present invention there is provided a method of coating a plastics coated glass fibre with metal by drawing said fibre through a metal melt, the surface of which is exposed to an oxygen rich atmsophere (by an oxygen rich atmosphere is meant an atmosphere containing sufficient oxygen to form an oxide layer on the melt).

Embodiments of the invention will now be described by way of exaple with reference to the accompanying drawings in which.

Figure 1:
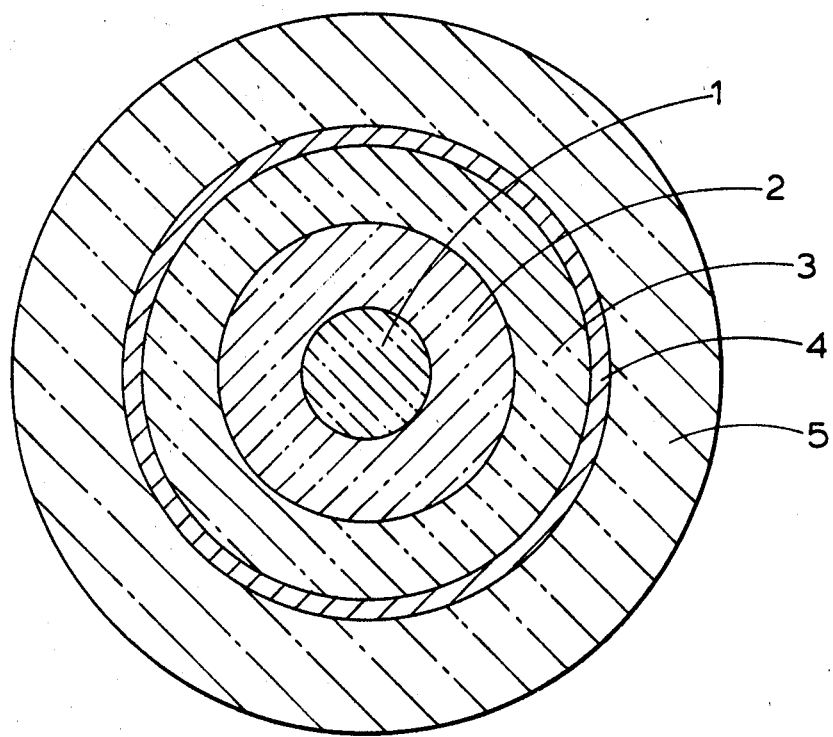
FIG. 1 is a section through a coated optical fibre according to the invention.

Referring now to the drawings and FIG. 1 in particular, a coated optical fibre according to the present invention comprises a glass core 1 surrounded by a glass cladding 2, which in turn is surrounded by layers 3, 4, and 5. The refractive index of core 1 is greater than that of cladding 2, although of course the junction between the core and cladding may be graded. Immediately surrounding and contiguous with the cladding 2 is a layer of plastics 3. Almost any type of polymer can be used for the layer 3, although a silicone resin such as SYLGARD TM is prefered. The advantage of this material is that it is stable up to a relatively high temperature and can therefore be used with a greater range of metal coatings than many other plastics, and it is soft thereby minimising micro bending losses.

Layer 4 consists of a thin metal coating formed on the surface of layer 3 by passing the plastics coated glass fibre through molten metal. The metal may be any low melting point metal e.g. indium, tin, lead, zinc, aluminium etc, or an alloy thereof. If an alloy of two or more metals is used it is desirable that a composition having a well defined melting point e.g. a eutectic or peritectic composition, be employed. Provided the coating is applied under the right conditions, it will be continuous, water impermeable, and will adhere to the plastics substrate. A peritectic alloy of 30% lead, and 70% indium has been found to be particularly suitable for this purpose. It appears that the melt surface needs to be exposed to oxygen if good adhesion to the plastics layer is to be obtained.

In addition to forming a water barrier, the metal coating forms a conductive path which might be used for the transmission of electric signals. It should be noted that because of its thinness and the low conductivity of some of the metals which may be employed, the resistance of the conductive path may be excessively high and its utility for this purpose is therefore limited.

The final layer 5, comprises a plastics material with the prime function of protecting the metal layer 4, which is delicate and susceptable to mechanical damage. Again almost any type of polymer may be used for this coating, but this time a hard coating, with a low coefficient of friction is to be preferred, suitable polymers are: epoxyacrylate (cured by ultra violet light), nylon (which must be extruded), and polyurethane.

The normal maximum strength of glass optical fibre for telecommunications, measured in terms of elongation before fracture is of the order of 4% for multicomponent glass optical fibre prepared by the double crucible process, and of the order of 8% for vitreous silica optical fibre prepared by the modified CVD process. (It should be emphasised that glasses do not fail mechanically in a reproducible and predictable manner, thus strength data must be interpreted in a statistical manner). By coating fibres in the manner described, strengths of the order of 1% strain before fracture should be obtained. The strength of the fibre—plastics—metal—plastics composite is limited by the yield point of the metal coating, so that the quoted figure of 1% could be considerably improved by choice of appropriate metals for the coating. However in comparing this figure with the strengths of conventional fibres it needs to be borne in mind that an initial strength of 4% corresponds to a long term strength of about 0.7% because of the continuous weakening effect on the fibre created by atmospheric attack. Loss of strength caused by atmospheric attack causes two major operational problems. If the fibre is in a stress free state the loss of strength is only apparent when the cable containing the fibres has to be handled for maintenance or repair e.g. raising a submarine cable for repeater repair. The reduced fibre strength means that the fibres are no longer able to withstand imposed stresses generated by the recovery and relaying operation and this can result in a massive cable failure. The second problem arises from static fatigue. Usually optical fibres in a layed cable are under some residual stress, this can magnify the effects of atmospheric corrosion by aiding crack growth etc. Loss of strength due to atmospheric corrosion therefore means that the layed cable, even if not disturbed, only has a finite lifetime before the onset of mechanical failure. Fibre protected by the coatings of the present invention should retain their initial strength throughout the operational life of the fibre. Thus the present invention provides a considerable improvement in the long term strength of multi-component glass optical fibres.

Since the strength of a pristine fibre (i.e. freshly formed with clean, uncontaminated, damage free, and flaw free surface) depends on the environment under which the fibre is coated, removal of water from the polymer coating prior to metal coating (dryer than normal atmosphere) may result in still higher strengths. It should be noted that the theoretical cohesive strength of multi-component glass fibres and vitreous silica glass fibres are of the order of 14% and 22% respectively.

Figure 2:
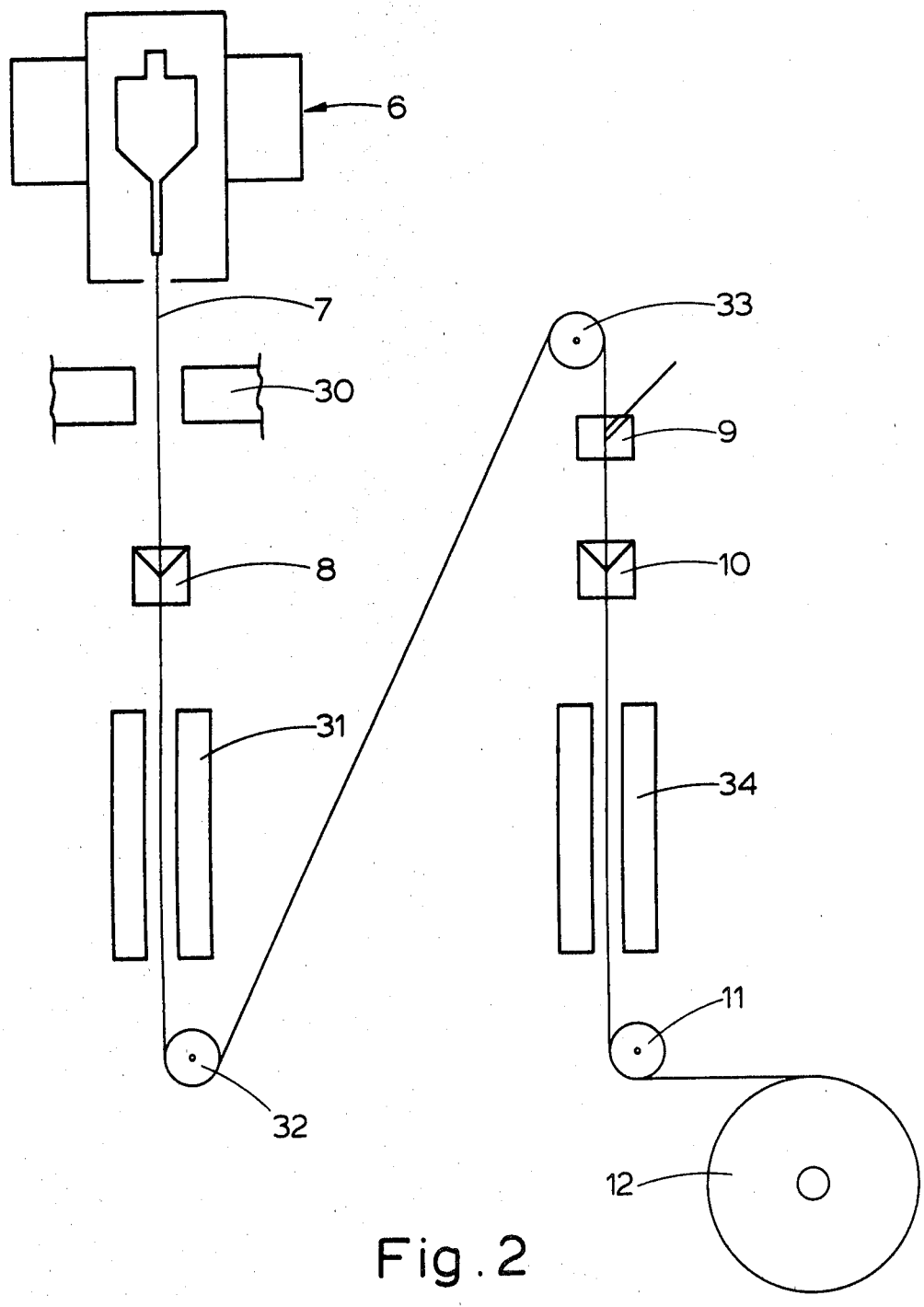
FIG. 2 is a schematic diagram of apparatus for coating an optical fibre in accordance with the present invention.
Figure 3:
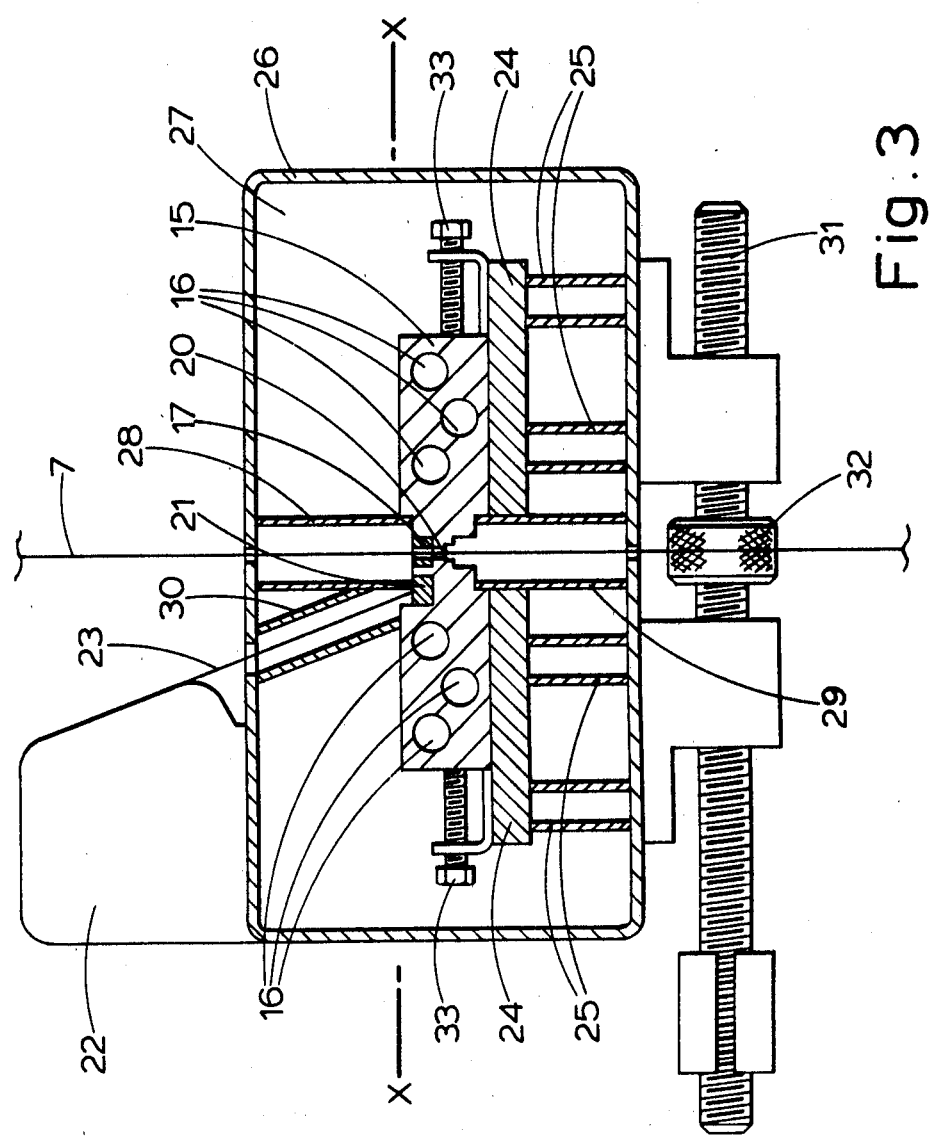
FIG. 3 is a vertical section through a device for coating a plastics coated glass fibre with metal in accordance with the present invention.
Figure 4:
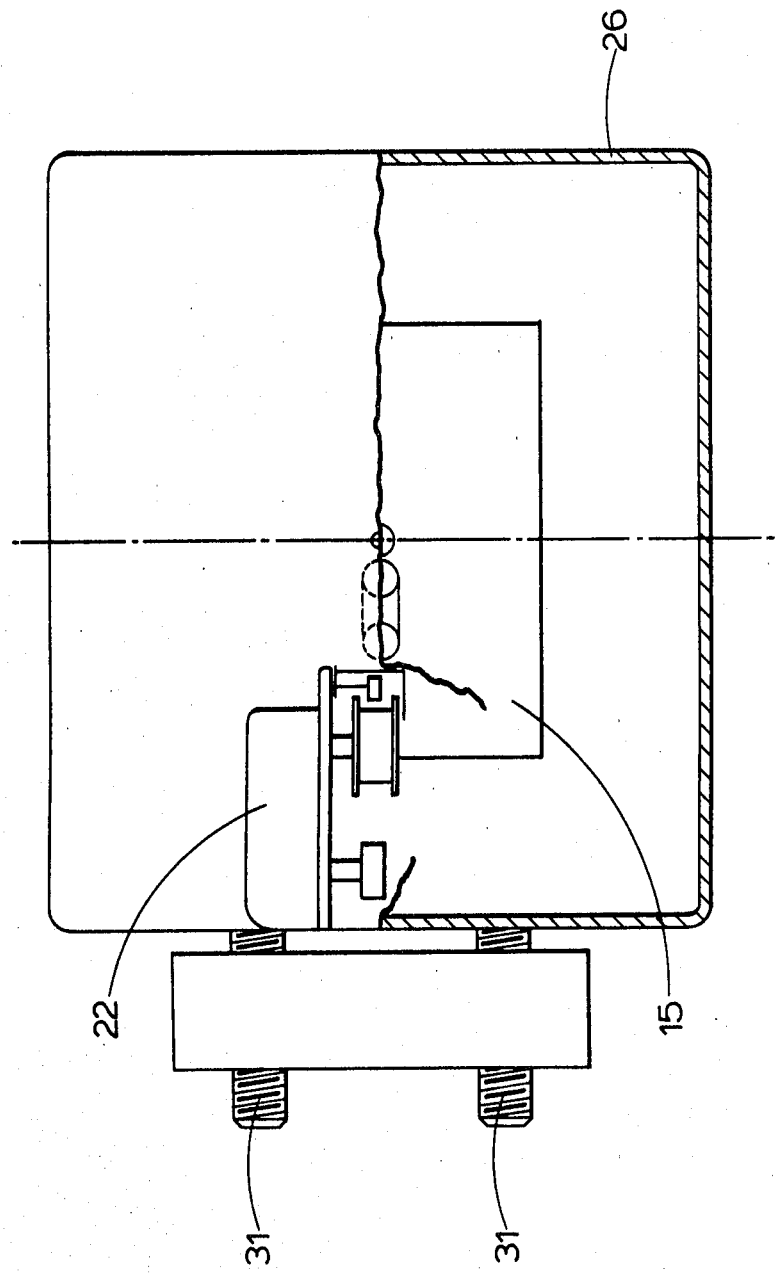
FIG. 4 is a partial section along lines X—X of FIG. 3.

Referring now to FIG. 2, there is shown a schematic representation of apparatus for producing and coating optical fibres by the double crucible process. At 6 there is shown a double crucible in a suitable furnace assembly from which is drawn a pristine optical fibre 7. After passing through diameter monitor 30, the fibre 7 is drawn through a first plastics coating bath 8, which coats the fibre with a silicone resin. The plastics coating bath 8 is a crucible having a small tapered nozzle in its base through which the fibre passes. To assist in setting up the apparatus initially, the crucible is split into two halves which are hinged together. Details of plastics coating techniques are well known, see reference above, and "Continuous Coating of Glass Fibres"—S. Torza J. Applied Physics—Volume 47 No. 9 1976. After coating, the fibre passes through a curing oven 31, where the SYLGARD silicone resin is cured at a temperature of 300° C. The plastics coated fibre after passing round pulleys 32 and 33 is drawn through the metal coating applicator 9, to be described in greater detail below. After passing through the applicator 9, the final plastics coating is applied using a crucible 10 similar to crucible 8, and cured by curing apparatus 34. The curing apparatus may be a UV source if the final coating is a UV curing resin, or a furnace similar to 31, if the coating is a thermally cured resin.

If nylon is used for the final coating, crucible 10 should be replaced by extrusion apparatus. Finally, the fully coated fibre passes round pulley 11 to winding drum 12.

The metal coating applicator will now be described in greater detail with reference to FIGS. 3 to 6. The plastics coated fibre 7 passes through a cylindrical channel 20 between two heated stainless steel blocks 15. This channel communicates with a recess 17 formed in the upper surface of the blocks 15. The recess 17 contains a globule of molten metal (also designated by reference numeral 17). A second recess 21 communicates with the first recess 17. The block 15 is heated by electrical resistance heaters 16. The level of molten metal in recesses 21 and 17 is maintained approximately constant when the equipment is in use, by means of an automatic wire feed mechanism 22 which feeds wire 23 into recess 21. The wire feed mechanism is controlled by a level detector not shown, which consists of a thermocouple positioned close to the desired level of molten metal. The heater blocks 15 are supported on alumina plates 24, which are in turn supported on metal pillars 25. The heated block is contained in a steel walled body 26, which is packed with thermal insulation 27 such as mineral wool. The passages through which the plastics coated fibre, and the metal feed wire pass are lined with silica tubes 28, 29 and 30.

In order to facilitate the initial setting up procedure, the block 15, and the steel walled box 26 are formed in two halves, which can separate by sliding along support rods 31. The two halves are held together by means of knurled nut 32, the ends of the rods extending into the knurled nut 32 having left and right handed screw threads formed upon them. Adjustment nuts 33 are provided, to enable the positions of the blocks 15 to be set so that when the two halves of the applicator are butted together, the internal heated blocks 15 are properly aligned.

Figure 5:
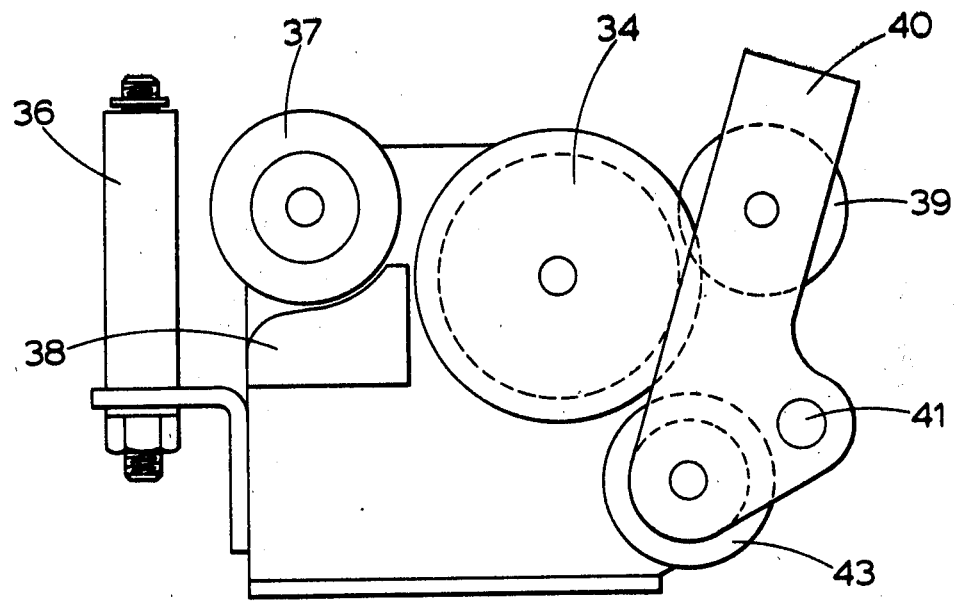
FIG. 5 is a front elevation of the automatic wire feed mechanism.
Figure 6:
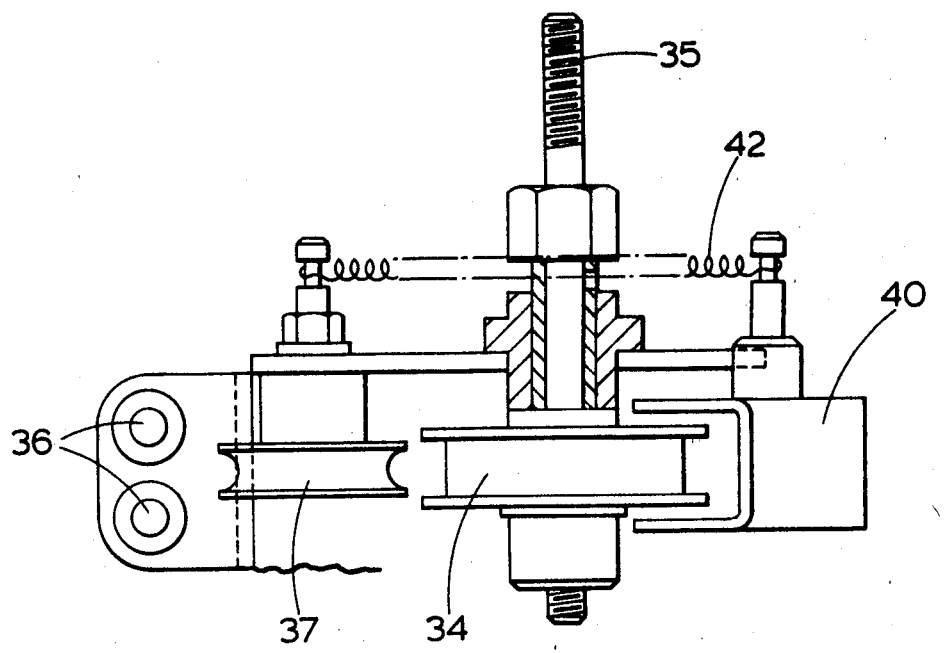
FIG. 6 is a plan view of the wire feed mechanism of FIG. 5.

Details of the automatic wire feed mechanism 22 are illustrated in FIGS. 5 and 6. A capstan 34 is driven by means of a servo controlled motor driving shaft 35. The wire enters the automatic feed through vertically mounted rollers 36 and passes between pulley 37 and guide plate 38. The wire then passes over capstan 34 and underneath pinch roller 39 mounted in a frame 40 pivoted at 41. The frame 40 is biased by means of spring 42 so that pinch roller 19 bears against capstan 34. The wire then passes from the pinch over pulley 43 and into the silica tube 30 (see FIG. 3).

When the equipment is set up, a fibre is drawn from the double crucible, passed around pulleys 32, 33 and 11 (FIG. 2) and attached to drum 12 which is rotated by a motor (not shown) at a speed determined by the required drawing rate for the desired fibre geometry. The hinged crucibles 8 and 10 are then closed around the fibre so that the fibre runs centrally through the tapered nozzles in the bottom of the crucible. The separated halves of the metal applicator block and casing are then slid along their support rails and the block is closed around the fibre. The crucibles 8 and 10 are filled with plastics, and a metal globule is formed in recess 17 of the blocks 15.

It should be noted that the passage in block 15 through which the plastics coated glass fibre passes can be regarded as a cylindrical die above which the melt is contained. Because of this the atmosphere above the melt can be different to that below. The coating quality is critically dependent on the atmosphere around the melt. An oxygen deficient atmosphere results in poor coating. It is desirable for an oxide layer to be formed above the melt to obtain good coatings. The term oxygen rich atmosphere as used in this specification should be interpreted as meaning an atmosphere containing sufficient oxygen to form an oxide layer on the molten metal which is not so thick as to cause non-uniform coatings and can include air within its ambit.

EXAMPLE 1

A Soda-boro-silicate graded index fibre having an external diameter of 125 microns was coated with SYLGARD 182 (DOW Corning) and cured at 300° C. to give a plastics coated glass fibre of external diameter 204 microns. An indium layer 15 microns thick was then applied to the coated fibre. The metal applicator was maintained at a temperature of 170° C.±1° C. (melting point of indium is 157° C.). The fibre pulling speed was 15 meters per minute and coating was carried out in air at ambient conditions of pressure when the air atmosphere was replaced with nitrogen, no coating occured. The metal melt was formed from high purity indium wire with a freshly cleaned surface.

EXAMPLE 2

A soda-boro-silicate graded index fibre having an external diameter of 125 microns was coated with SYLGARD 182 and cured at 300° C. to give a plastics coated glass fibre of external diameter 204 microns. A lead layer 21 microns thick was then applied to the coated fibre. The metal applicator was maintained at a temperature of 390° C.±1° C. (melting point of lead is 327° C.). The fibre pulling speed was 50 meters per minute and coating was carried out in air at ambient pressure.

EXAMPLE 3

A soda-boro-silicate graded index fibre having an external diameter of 125 microns was coated with a silicone resin (SYLGARD 182) and cured at 300° C. to give plastics coated glass fibre of external diameter 245 microns. A layer of indium lead alloy 20 microns thick was then applied to the coated fibre. The indium lead alloy was a peritectic alloy having a melting point of about 172° C., and comprising 30% lead, and 70% indium. The metal applicator was maintained at a temperature of 185° C. and the level of melt in the applicator was maintained by continuously feeding metal wire into the applicator. The coating operation was performed with an atmosphere of oxygen above the melt and an atmosphere of nitrogen below the melt. The melt layer was then coated with a 32 micron thick layer of UV curable epoxyacrylate polymer which was cured by exposure to a UV lamp. The fibre pulling speed was 15 meters per minute, and the resultant composite fibre had an outside diameter of 349 microns.

Still further enhancement in fibre strength may be obtained by applying a passivating layer of a ceramic type material to the glass surface of an optical fibre before coating the fibre with plastics material. Suitable ceramic materials for this purpose are $Si_3N_4$ or $SiC$ which can be applied directly to the fibre surface by deposition from the vapour surface. The ceramic coating probably becomes part of the glass surface, is not affected by water, and prevents water diffusing through to the underlying glass.

We claim:

1. A method of improving the resistance of a glass optical fibre to attack by atmosphere, such as water, comprising the sequential steps of coating the fibre with a plastics material and drawing said plastics coated fibre through a metal melt, the surface of which is exposed to an oxygen rich atmosphere and thus forming an oxide layer on said plastics coated fibre.

2. A method according to claim 1 in which said metal is any one of, or an alloy having a well defined melting point of two or more of, indium, lead, tin, zinc and aluminium.

3. A method according to claim 1 in which said metal comprises indium.

4. A method according to claim 3 in which the plastics material with which the glass fibre is coated is a silicone resin.

5. A method according to claim 1 in which said metal comprises lead.

6. A method according to claim 5 in which the plastics material with which the glass fibre is coated is a silicone resin.

7. A method according to claim 1 in which said metal comprises an alloy of indium and lead.

8. A method according to claim 7 in which the plastics material with which the glass fibre is coated is a silicone resin.

9. A method according to claim 1 in which said metal comprises a peritectic alloy containing 70% indium and 30% lead.

10. A method according to claim 9 in which the plastics material with which the glass fibre is coated is a silicone resin.

11. A method according to claim 1 in which the plastics material with which the glass fibre is coated is a silicone resin.

12. A method according to claim 1 in which said fibre is passed through an oxygen deficient atmosphere after coating with metal.

13. A method of coating a plastics coated glass fibre comprising the steps of coating said fibre with metal by a method according to claim 11 and then applying to the surface of said metal coating a second plastics coating.

14. A method according to claim 13 in which said second plastics coating comprises one of the materials hereinafter listed: silicone resin, exoxy acrylate, nylon and polyurethane.

* * * * *